US009053417B2

(12) United States Patent
Hyman et al.

(10) Patent No.: US 9,053,417 B2
(45) Date of Patent: Jun. 9, 2015

(54) DOMAIN LEVEL CLUSTERING (71) Applicant: Google Inc., Mountain View, CA (US)

(72) Inventors: Joshua Mark Hyman, Encino, CA (US); Joel Ingram, Chicago, IL (US)

(73) Assignee: Google Inc., Mountain View, CA (US)

( * ) Notice: Subject to any disclaimer, the term of this patent is extended or adjusted under 35 U.S.C. 154(b) by 281 days.

(21) Appl. No.: 13/713,623

(22) Filed: Dec. 13, 2012

(65) Prior Publication Data

US 2013/0166487 A1 Jun. 27, 2013

Related U.S. Application Data (60) Provisional application No. 61/578,565, filed on Dec. 21, 2011.

(51) Int. Cl.
*G06N 5/02* (2006.01)
*G06F 17/30* (2006.01)

(52) U.S. Cl.
CPC .............. *G06N 5/02* (2013.01); *G06F 17/3071* (2013.01)

(58) Field of Classification Search
CPC ........... G06N 5/02; G06N 5/04; G06N 5/003; G06N 99/005; G06F 17/3071
USPC .................................... 706/46; 707/2, 3, 742
See application file for complete search history.

(56) References Cited

U.S. PATENT DOCUMENTS

| | | | |
|---|---|---|---|
| 2008/0010291 A1* | 1/2008 | Poola et al. ..................... 707/10 |
| 2008/0010292 A1* | 1/2008 | Poola .............................. 707/10 |
| 2008/0294602 A1* | 11/2008 | Permandla et al. ............... 707/3 |
| 2009/0216708 A1* | 8/2009 | Madaan et al. ................... 707/2 |
| 2012/0150867 A1* | 6/2012 | Contractor et al. ........... 707/742 |

* cited by examiner

Primary Examiner — Jeffrey A Gaffin
Assistant Examiner — Dave Misir (57) ABSTRACT A computer implemented method for clustering documents that includes receiving at least a first first-level cluster of documents and a second first-level cluster of documents, wherein the first first-level cluster includes one or more first documents associated with a first domain, the first documents satisfying a first first-level classification criterion, and the second first-level cluster including one or more second documents associated with a second domain, the second documents satisfying a second first-level classification criterion. The method also includes creating, by a processor of the computer system, a second-level cluster by combining the first first-level cluster with the second first-level cluster when a) the first first-level cluster and second first-level cluster satisfy a second-level classification criterion; and b) the first domain does not match the second domain.

17 Claims, 10 Drawing Sheets

Second-level Cluster – Option A

Second-level Cluster – Option B

Second-level Cluster – Option A

Second-level Cluster – Option B

DOMAIN LEVEL CLUSTERING

CROSS-REFERENCE TO RELATED APPLICATION

This application is a Nonprovisional of, and claims priority to, U.S. Patent Application No. 61/578,565, filed on Dec. 21, 2011, entitled "DOMAIN LEVEL CLUSTERING", which is incorporated by reference herein in its entirety.

BACKGROUND

Clustering searchable documents is useful for eliminating duplicate content and showing greater diversity within search results. One of the more challenging aspects of clustering web related documents (e.g., web pages, images and videos) is that conventional methods produce clusters that include too many documents or documents that are duplicated or substantially duplicated. A need therefore exists for improved methods and systems for clustering documents.

SUMMARY

One implementation is a computer implemented method for clustering documents that includes receiving at least a first first-level cluster of documents and a second first-level cluster of documents. The first first-level cluster may include one or more first documents associated with a first domain, the first documents satisfying a first first-level classification criterion. The second first-level cluster may include one or more second documents associated with a second domain, the second documents satisfying a second first-level classification criterion. The method also includes creating a second-level cluster by combining the first first-level cluster with the second first-level cluster if a) the first first-level cluster and second first-level cluster satisfy a second-level classification criterion and b) the first domain does not match the second domain.

In some implementations, the documents are web pages and the first-level classification criterion includes matching titles of web pages. In some implementations, the first-level classification criterion further includes matching titles of web pages or matching descriptions of web pages. In some implementations, when the first domain matches the second domain the method includes creating a first second-level cluster from at least the first first-level cluster of documents and creating a second second-level cluster from at least the second first-level cluster. In some embodiments, the method includes creating an index of the documents of the second-level cluster. In some implementations, when the first domain matches the second domain the method includes receiving a third first-level cluster of documents, wherein the third first-level cluster includes one or more third documents associated with a third domain and at least one of the third documents satisfying the first first-level classification criterion, creating a first second-level cluster from at least the second first-level cluster of documents, and creating a second second-level cluster by combining at least the first first-level cluster with the third first-level cluster when the first domain does not match the third domain.

Another embodiment is a system for clustering documents. The system includes a processor and a memory. The memory includes code representing instructions that when executed cause the processor to receive at least a first first-level cluster of documents and a second first-level cluster of documents. Each first-level cluster includes one or more documents, and each of the one or more documents within each of the first-level clusters is associated with a domain and has a first-level classification feature value that satisfies a predetermined criterion. The memory also includes code representing instructions that when executed cause the processor to create a second-level cluster by combining the first first-level cluster with the second first-level cluster if: a) the first first-level cluster and second first-level cluster have a second-level classification feature value that satisfies a predetermined criterion and b) the domain of the first first-level cluster does not match the domain of the second first-level cluster.

In some embodiments, the documents are web pages and the predetermined criterion is the domain for the web pages. In some embodiments, the memory includes code representing instructions that when executed cause the processor to assign a cluster identifier to the first-level clusters. In some embodiments, the memory includes code representing instructions that when executed cause the processor to create a third-level cluster by combining a first second-level cluster with a second second-level cluster if: a) the first second-level cluster and second second-level cluster have a third-level classification feature value that satisfies a predetermined criterion and b) the domains of the first second-level cluster do not match the domains of the second second-level cluster. In some embodiments, the memory includes code representing instructions that when executed cause the processor to create an index of the documents of the second-level cluster.

Another embodiment is a computer implemented method for clustering a plurality of first-level clusters of documents. Each first-level cluster of documents is of the same domain. The method includes a) selecting a first, first-level cluster of a first domain and b) marking the first, first-level cluster as a first, second level cluster. The method also includes c) selecting one first-level cluster from each domain other than the first domain. The method also includes d) assigning each of the first-level clusters from each domain other than the first domain to the first, second-level cluster and e) emitting the second-level cluster.

In some embodiments, the method includes repeating steps a), b), c), d) and e) for a second, first-level cluster. In some embodiments, the method includes repeating steps a), b), c), d) and e) until all first-level clusters have been assigned to a second-level cluster. In some embodiments, the step c) selecting one first-level cluster from each domain other than the first domain includes randomly selecting one first-level cluster from each domain other than the first domain.

Another embodiment is a system for clustering a plurality of first-level clusters of documents. Each first-level cluster of documents is of the same domain. The system includes a processor and a memory. The memory includes code representing instructions that when executed cause the processor to a) select a first, first-level cluster of a first domain and b) mark the first, first-level cluster as a first, second level cluster. The memory includes code representing instructions that when executed cause the processor to c) select one first-level cluster from each domain other than the first domain. The memory includes code representing instructions that when executed cause the processor to d) assign each of the first-level clusters from each domain other than the first domain to the first, second-level cluster and e) emit the second-level cluster.

In some embodiments, the memory includes code representing instructions that when executed cause the processor to repeat steps a), b), c), d) and e) for a second, first-level cluster. In some embodiments, the memory includes code representing instructions that when executed cause the processor to repeat steps a), b), c), d) and e) until all first-level clusters have been assigned to a second-level cluster. In some embodiments, the memory includes code representing instructions that when executed cause the processor to randomly select one first-level cluster from each domain other than the first domain.

The clustering methods and systems described herein (hereinafter "technology") can provide one or more of the following advantages. One advantage of the technology prevents over clustering of documents through use of a two-level clustering algorithm. Another advantage of the technology prevents clustering of duplicate or substantially similar documents.

Another embodiment is a computer implemented method that includes receiving a first document having a first clustering value and a second clustering value from a first domain and assigning the first document to a first first-level cluster. The method also includes receiving a second document having a third clustering value and a fourth clustering value from the first domain, the third and fourth clustering values differing from the first and second clustering values and assigning the second document to a second first-level cluster based on the third and fourth clustering values differing from the first and second clustering values. The method further includes receiving a third document having the first clustering value and the fourth clustering value from a second domain, the second domain differing from the first domain and assigning the third document to a third first-level cluster based on the second domain differing from the first domain. The method also includes generating a first second-level cluster by combining the third first-level cluster with one of the first first-level cluster and the second first-level cluster based on the second domain differing from the first domain and generating a second second-level cluster that includes either the first first-level cluster that was not combined with the third first-level cluster or the second first-level cluster that was not combined with the third first-level cluster.

In some implementations, generating the first second-level cluster may include selecting either the first first-level cluster or the second first-level cluster at random for inclusion in the first second-level cluster. In some implementations all members of a particular first-level cluster are from the same domain and all members of a particular second-level cluster are from first-level clusters with differing domains. In some implementations, the third first-level cluster is combined with the first first-level cluster based on matching first clustering values.

Other aspects and advantages of the technology will become apparent from the following detailed description, taken in conjunction with the accompanying drawings, illustrating the principles of the technology by way of example only.

BRIEF DESCRIPTION OF THE DRAWINGS

The foregoing features of various embodiments will be more readily understood by reference to the following detailed descriptions in the accompanying drawings.

DETAILED DESCRIPTION OF ILLUSTRATIVE EMBODIMENTS

Clustering searchable documents (for example, web pages, images and videos) is useful for eliminating duplicate content and showing greater diversity within search results. The clustering techniques described minimize, for example, the over clustering within a domain due to clustering features that are introduced outside of the domain. One of the difficult aspects of clustering web related documents is conventional methods produce clusters that include too many documents or documents that are duplicated or substantially duplicated. For example, the same document may appear duplicated or substantially duplicated in different forms or at different places (e.g., different URLs) on the web. A "document" as the term is used herein is to be broadly interpreted to include any machine-readable and machine-storable work product.

In one embodiment, two-level clustering is used to avoid over clustering of documents. Once all documents have been assigned to a first, domain-level cluster, the domain-level clusters are then clustered between the domains to form the second, top-level clusters such that a top level cluster may contain at most one domain-level cluster per domain.

Figure 1A:
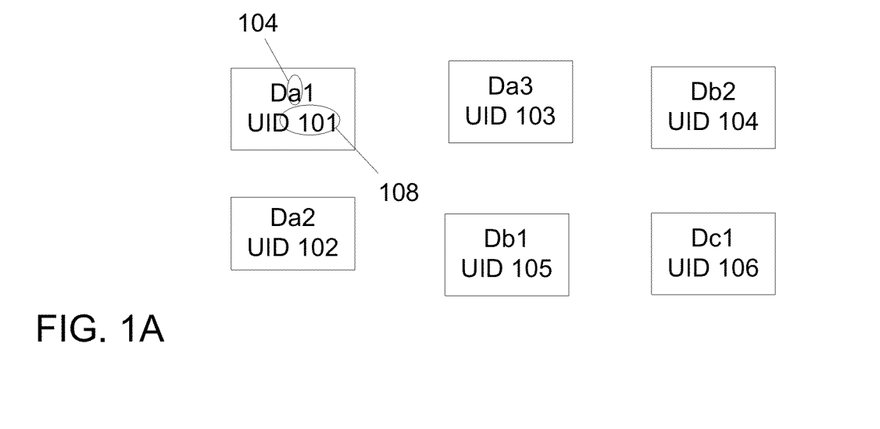
FIGS. 1A-1C depict a process for clustering documents, according to an illustrative embodiment.
Figure 1B:
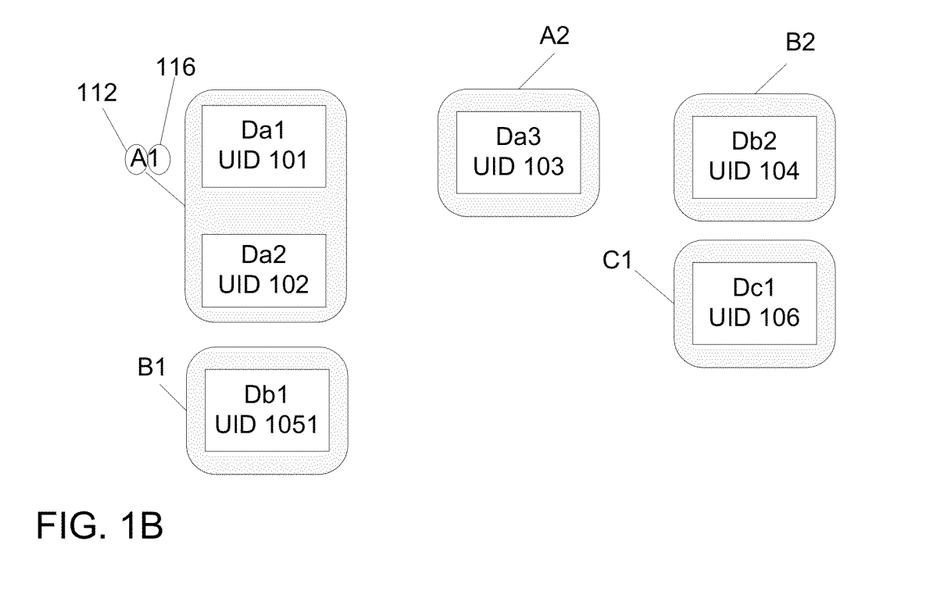
Figure 1C:
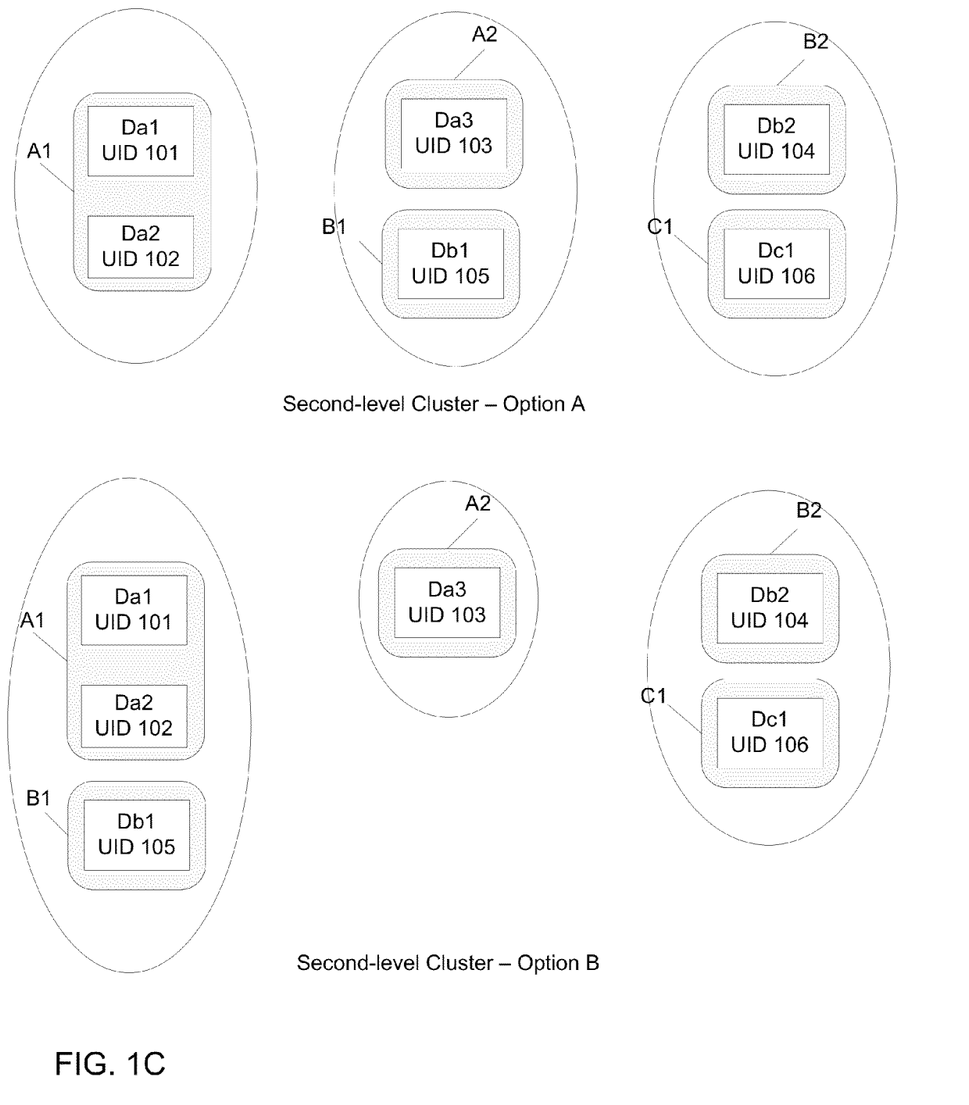

FIGS. 1A-1C depict a process for clustering documents, according to an illustrative embodiment. FIG. 1A depicts a plurality of documents Da1, Da2, Da3, Db1, Db2, and Dc3 that are to be clustered together. The documents include the domain 104 of the document and a unique identifier 108. The number and types of documents to be clustered will vary in different embodiments. In this embodiment, depicted in FIG. 1B, a clustering algorithm is applied to the plurality of documents to create five first-level clusters of the documents: clusters A1, A2, B1, B2, and C1. The designations A1, A2, B1, B2, and C1 are first-level cluster identifiers. The cluster identifiers can include information to describe the contents of the clusters. In this embodiment, the cluster identifiers include a designation of the domain 112 of the documents within the cluster and a unique identifier 116. By way of example, for the cluster identifier "A1," the first digit "A" corresponds to the domain of the web objects within the cluster and the second digit "1" is a unique identifier specifying the cluster A1 as the first, first-level cluster for domain "A." In this embodiment, documents Da1 and Da2 are grouped together in cluster A1. In this embodiment, Da1 and Da2 are clustered together because they both have a common feature (e.g., document title, not shown). Document Da3 is grouped in cluster A2. Document Db1 is grouped in cluster B1. Document Db2 is grouped in cluster B2. Document Dc1 is grouped in cluster C1.

The clustering algorithm is then applied to the first-level clusters to produce second-level clusters. The clustering at the second-level adds a constraint that each second-level cluster cannot include more than one first-level cluster of a particular domain. For example, first-level clusters A1, A2, and B1 may not be grouped together into a second-level cluster because cluster A1 has domain ("a") and cluster A2 has the same domain ("a"). So instead, the algorithm may group the first-level clusters in either of the following ways (depicted in FIG. 1C):

Option A—{A1} {A2, B1} {B2, C1}=>{Da1, Da2} {Da3, Db1} {Db2, Dc1}; or

Option B—{A1, B1} {A2} {B2, C1}=>{Da1, Da2, Db1} {Da3} {Db2, Dc1}

Typically depending on the application, a simple heuristic is used to choose one of the possible clustering configurations. In this embodiment, {Da1, Da2} is not clustered with {Da3} because they were not clustered together during the first-level clustering for documents based on their respective domain and first-level classification features.

Figure 2:
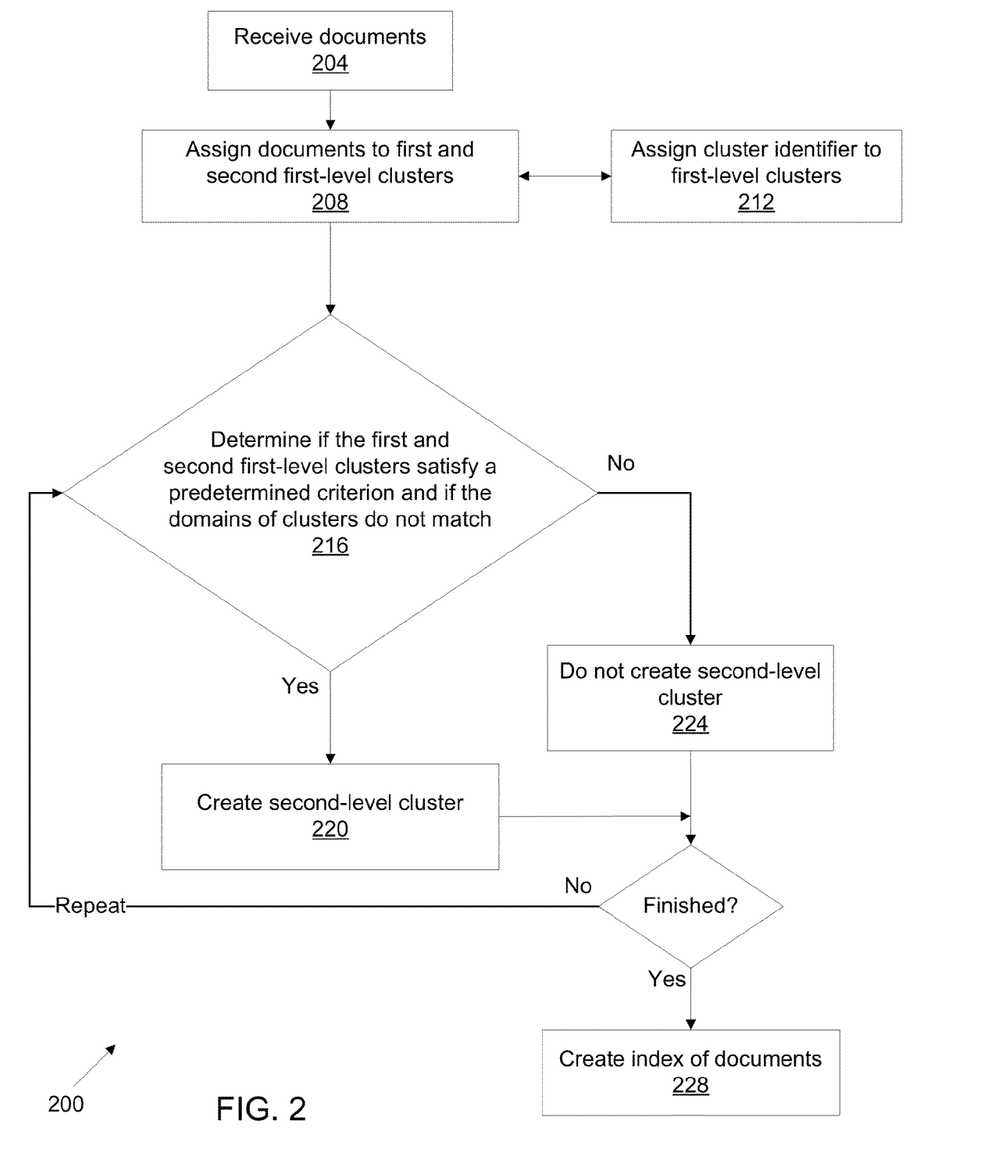
FIG. 2 is a flowchart of a method for clustering documents, according to an illustrative embodiment.

FIG. 2 is a flowchart 200 of a method for clustering documents, according to an illustrative embodiment. It is generally assumed that a set of documents are already available for clustering, however, for clarity of illustration the method described includes receiving 204 a plurality of documents that are to be grouped into clusters. The method also includes assigning 208 the documents to a first first-level cluster and a second first-level clusters. Two first-level clusters are described in this embodiment; however, in other embodiments two or more first-level clusters are included.

The method also includes determining 216 if a) the first first-level cluster and the second-first level cluster have a second-level classification feature value that satisfies a predetermined criterion and b) the domain of the first first-level cluster does not match the domain of the second first-level cluster. The method then involves creating 220 the second-level cluster if a) the first first-level cluster and the second-first level cluster have a second-level classification feature value that satisfies a predetermined criterion (e.g., the titles match) and b) the domain of the first first-level cluster does not match the domain of the second first-level cluster.

No second-level cluster is created (224), however, if a) the first first-level cluster and the second-first level cluster does not have a second-level classification feature value that satisfies a predetermined criterion or b) the domain of the first first-level cluster matches the domain of the second first-level cluster. The method also includes repeating step 216 for additional first-level clusters (as described, for example, with respect to FIG. 6).

The method also includes creating an index 228 of the documents of the second level cluster. The index may, for example, catalog and maintain a copy of the documents in the cluster and/or a location or a pointer to the documents (e.g., URL). Accordingly, the technology described is able to, for example, prevent the indexer from indexing duplicate documents. Duplicate documents could otherwise lead to search results that would be undesirable to the user because the user does not want to be presented with multiple documents in a search result that contain the same, or substantially the same, content. Further, indexing duplicate documents wastes resources (e.g., memory, processing). Given a set of duplicate documents, an indexer may select one of these documents to index. However, determining which of the duplicate documents to index can be difficult. Additionally, given the volume of documents that an indexer may be processing, differences in freshness among the documents exists. For example, while the crawler may re-visit documents to determine if changes have been made, the crawler may not re-visit all of the documents at the same time and/or with the same frequency.

Figure 3A:
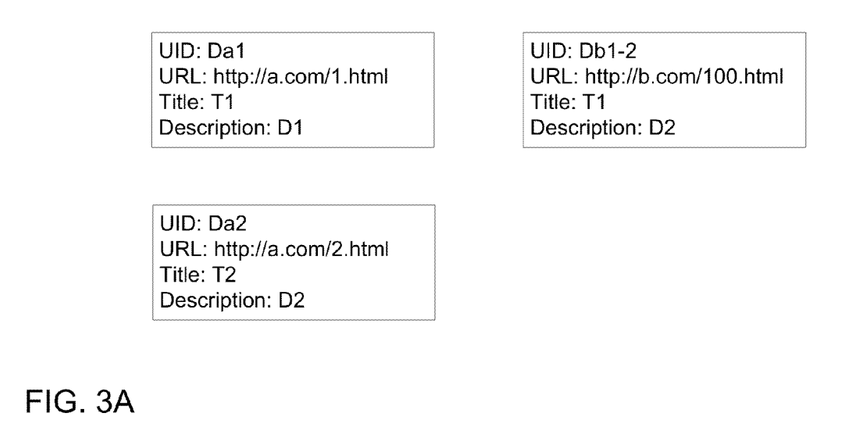
FIGS. 3A-3C depict a process for clustering documents, according to an illustrative embodiment.
Figure 3B:
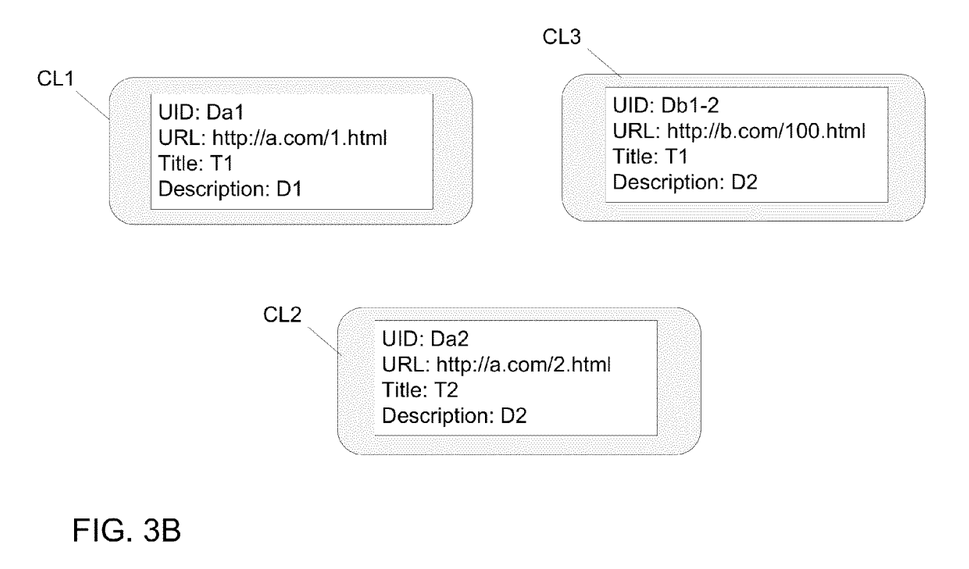
Figure 3C:
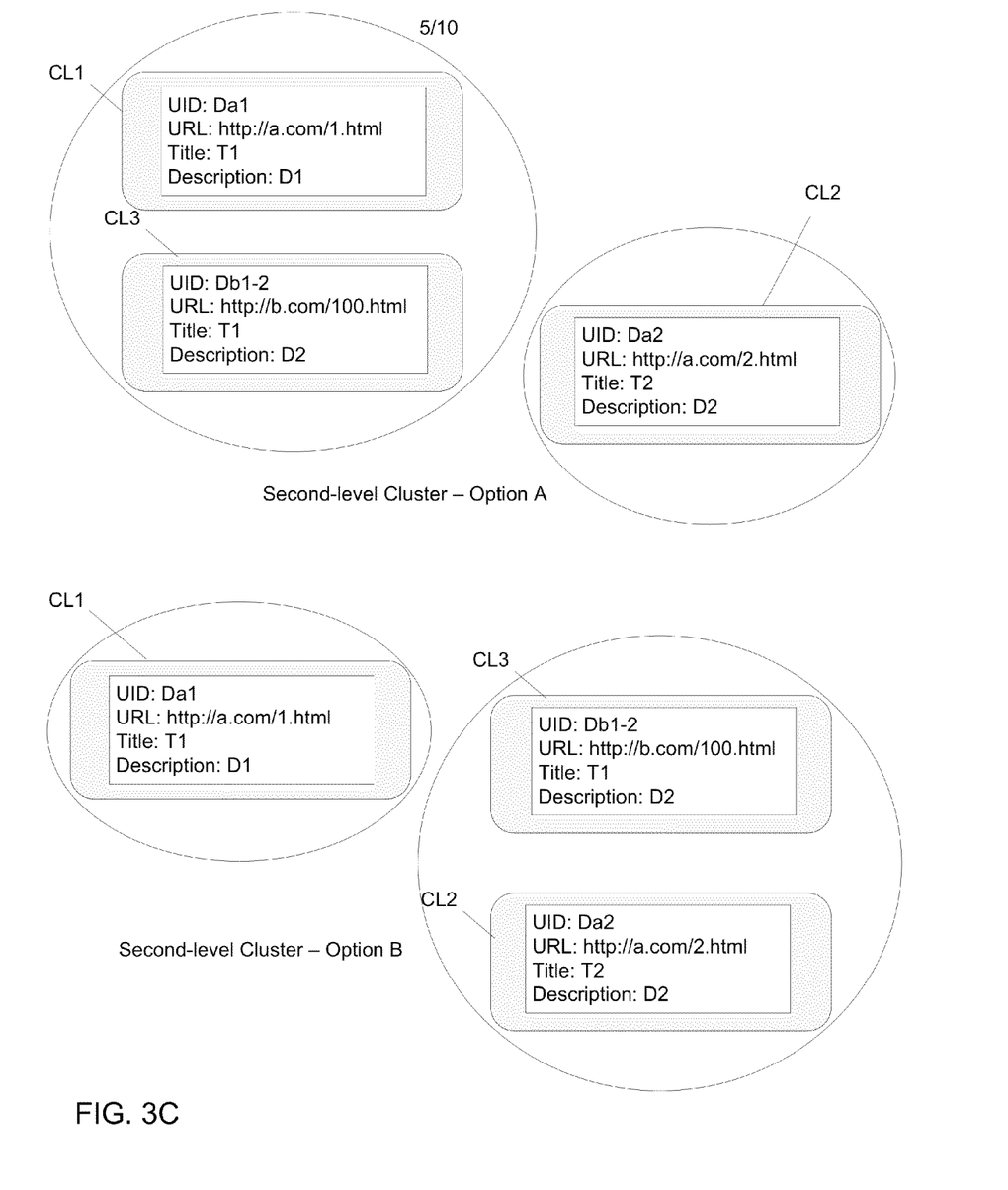

FIGS. 3A-3C depict a process for clustering documents, according to an illustrative embodiment. FIG. 3A depicts three documents Da1, Da2, and Db1-2 that are to be clustered together. The number and types of documents to be clustered will vary in different embodiments. Each document includes a unique identifier (UID), a uniform resource locator (URL), a title (Title), and a description (Description). By way of example, document Da1 has a Title value of T1 and a Description value of D1. Initially, the method involves identifying documents with a URL of the same domain. Documents Da1 and Da2 have a URL of the same domain (a.com) and Document Db1-2 has a URL with the domain "b.com."

The clustering algorithm operates on documents that have a URL of the same domain. The clustering algorithm operates on Documents Da1 and Da2 and then separately on Document Db1-2. The first-level clusters are created based on documents that have a first level-classification feature value that satisfies a predetermined criterion. In this embodiment, the first-level classification feature is the Title of the document and the Description of the document. In this embodiment, documents are grouped into the same cluster if the value of the Title of a document or Description of a document matches for documents of the same domain. In this embodiment, depicted in FIG. 3B, the clustering algorithm groups the documents into clusters CL1, CL2, and CL3. Documents Da1 and Da2 have a URL of the same domain; however the documents are not grouped together because neither the Title nor the Description matches for Documents Da1 and Da2. Document Da1 is clustered into cluster CL1. Document Da2 is clustered in cluster CL2. Document Db1-2 is grouped in cluster CL3.

The clustering algorithm is then applied to the first-level clusters (CL1, CL2, and CL3) to produce second-level clusters. The clustering at the second-level requires clusters to include documents that have a matching second-level classification feature value and adds a constraint that each second-level cluster cannot include more than one first-level cluster for each domain. In this embodiment, the second-level classification feature is the Title of the document and the Description of the document. In this embodiment, even though CL3 has second-level classification feature values that match both CL1 and CL2, first-level clusters CL1 and CL2 may not both be grouped together into a second-level cluster with CL3 because cluster CL1 has a URL with a domain that matches the domain of CL2. So instead, the algorithm may group the first-level clusters into either of the following ways (depicted in FIG. 3C):

Option A—{CL1, CL3} {CL2}; or

Option B—{CL1}, {CL2, CL3}

Figure 4:
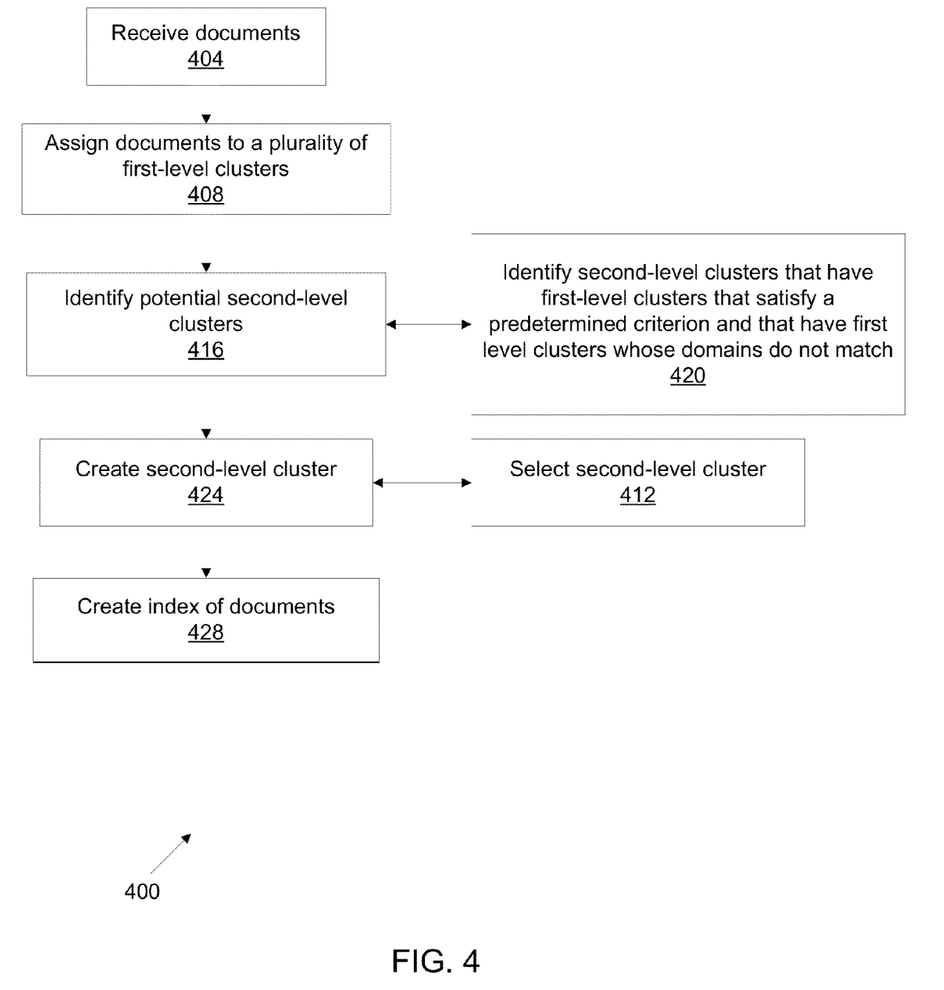
FIG. 4 is a flowchart of a method for clustering documents, according to another illustrative embodiment.

FIG. 4 is a flowchart 400 of a method for clustering documents, according to another illustrative embodiment. The method includes receiving 404 a plurality of documents to be clustered. The method also includes assigning 408 the documents to a plurality of first-level clusters. In some embodiments, the method does not begin with receiving 404 the document and assigning 408 the documents to clusters; rather, the method begins with receiving a plurality of first-level clusters.

The next step of the method includes identifying 416 potential second-level clusters to be created based on the first-level clusters. In this embodiment, potential second-level clusters are identified by identifying 420 second-level clusters that have a) first-level clusters that satisfy a predetermined criterion and b) first-level clusters whose domains do not match. The method also includes creating a second-level cluster 424 that satisfies the conditions of the identification step 420. In embodiments where multiple, potential second-level clusters are identified, the method may optionally include selecting 412 one of the potential second-level clusters. The method also includes creating 428 an index of the documents in the second-level clusters.

Figure 5:
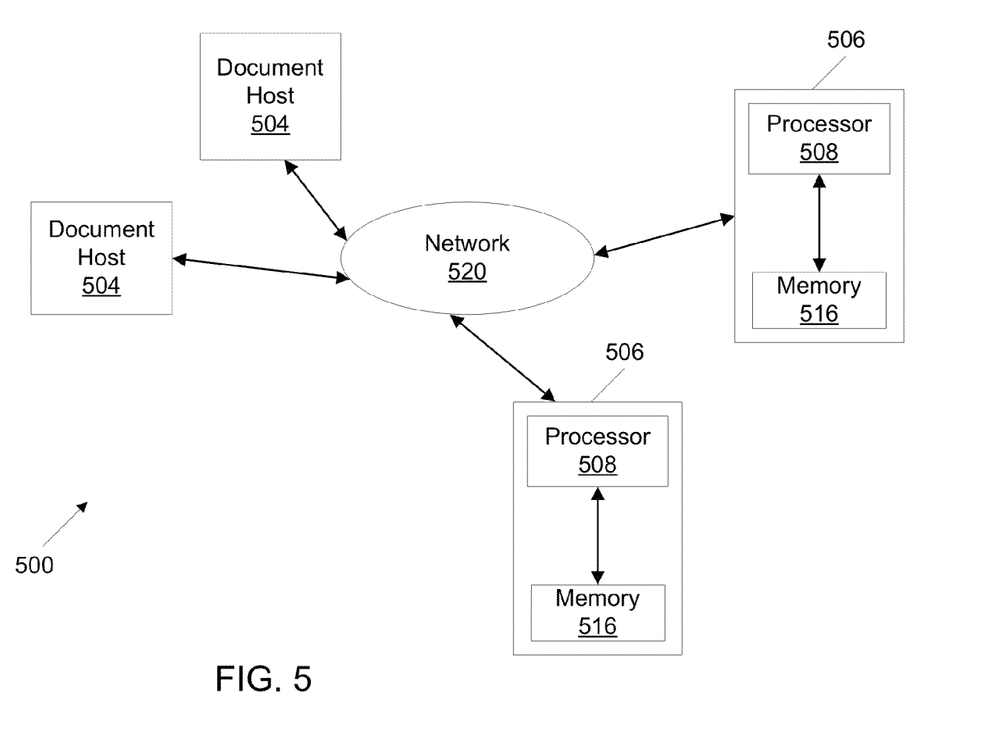
FIG. 5 is a schematic illustration of a system for clustering documents, according to an illustrative embodiment.

FIG. 5 is a schematic illustration of an exemplary environment 500 in which the systems and methods described herein may be implemented. The environment 500 includes one or more systems 506 for clustering documents provided by one or more document hosts 504 that store documents. Each system 506 includes a processors 508 coupled to memory 516. Documents and/or already clustered documents are provided to the processors 508 via a network 520. In this embodiment, the memory 516 includes code representing instructions that when executed cause the processor 508 to receive at least a first first-level cluster of documents and a second first-level cluster of documents. Each first-level cluster includes one or more documents, and each of the one or more documents within each of the first-level clusters are of the same domain and has a first-level classification feature value that satisfies a predetermined criterion. The memory 516 also includes code representing instructions that when executed cause the processor 508 to create a second-level cluster by combining the first first-level cluster with the second first-level cluster if a) the first first-level cluster and second first-level cluster have a second-level classification feature value that satisfies a predetermined criterion and b) the domain of the first first-level cluster does not match the domain of the second first-level cluster. The system 506 may also include a computer-readable storage device (not shown) that stores instructions that, when executed by processor 508, cause the computer system 506 to perform any of the operations described herein. The computer-readable storage device may be any device used to store computer-readable information but does not include transitory propagating signals.

Figure 6:
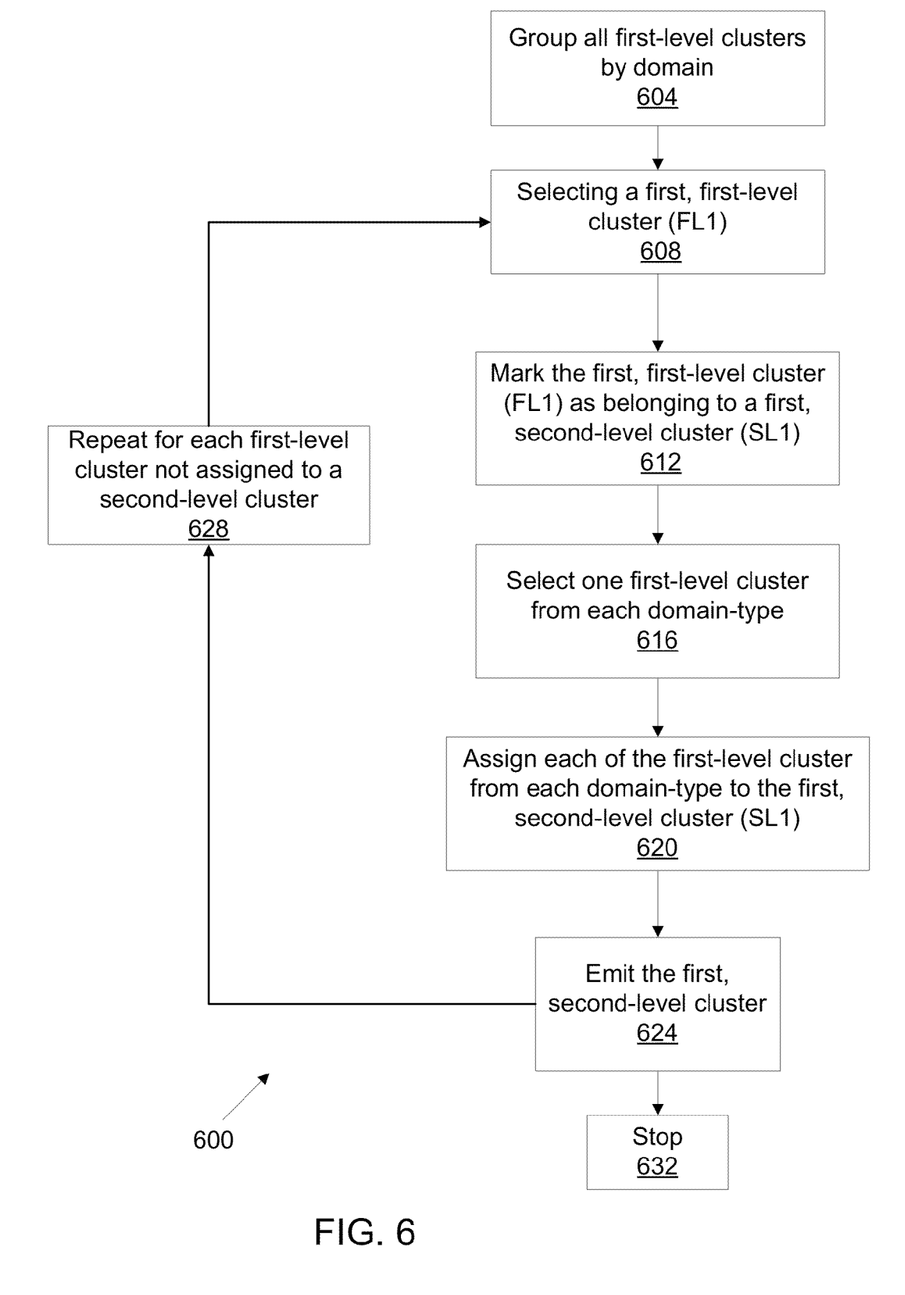
FIG. 6 is a flowchart of a method for clustering documents, according to another illustrative embodiment.

FIG. 6 is a flowchart 600 of a method for clustering a plurality of first-level clusters of documents, according to another illustrative embodiment. Each first-level cluster contains documents of a single domain. The method includes grouping 604 all first-level clusters by the domain of the documents in the cluster. The method also includes selecting 608 a first, first-level cluster (FL1). The method also includes marking 612 the first, first-level cluster (FL1) as belonging to a first, second-level cluster (SL1).

The method then proceeds with operating on the remaining first-level clusters. The method includes selecting 616 one first-level cluster from each domain other than the domain of the first, first-level cluster (FL1). If multiple first-level clusters are available for the remaining domain types and there is no measure of which one is a better match, one is selected at random. The method then includes assigning 620 each first-level from each domain to the first, second-level cluster (SL1). After trying to match first-level clusters from each domain, the method includes emitting 624 the first, second-level cluster (SL1) to, for example, an indexer for indexing the cluster.

The method then includes repeating 628 steps 608, 612, 616, 620, and 624 for each additional first-level cluster not assigned to a second-level cluster. This creates additional second-level clusters (e.g., SL2, SL3, SL4). The method stops 632 when all first-level clusters have been assigned to a second-level cluster.

Comprise, include, and/or plural forms of each are open ended and include the listed parts and can include additional parts that are not listed. And/or is open ended and includes one or more of the listed parts and combinations of the listed parts.

Figure 7:
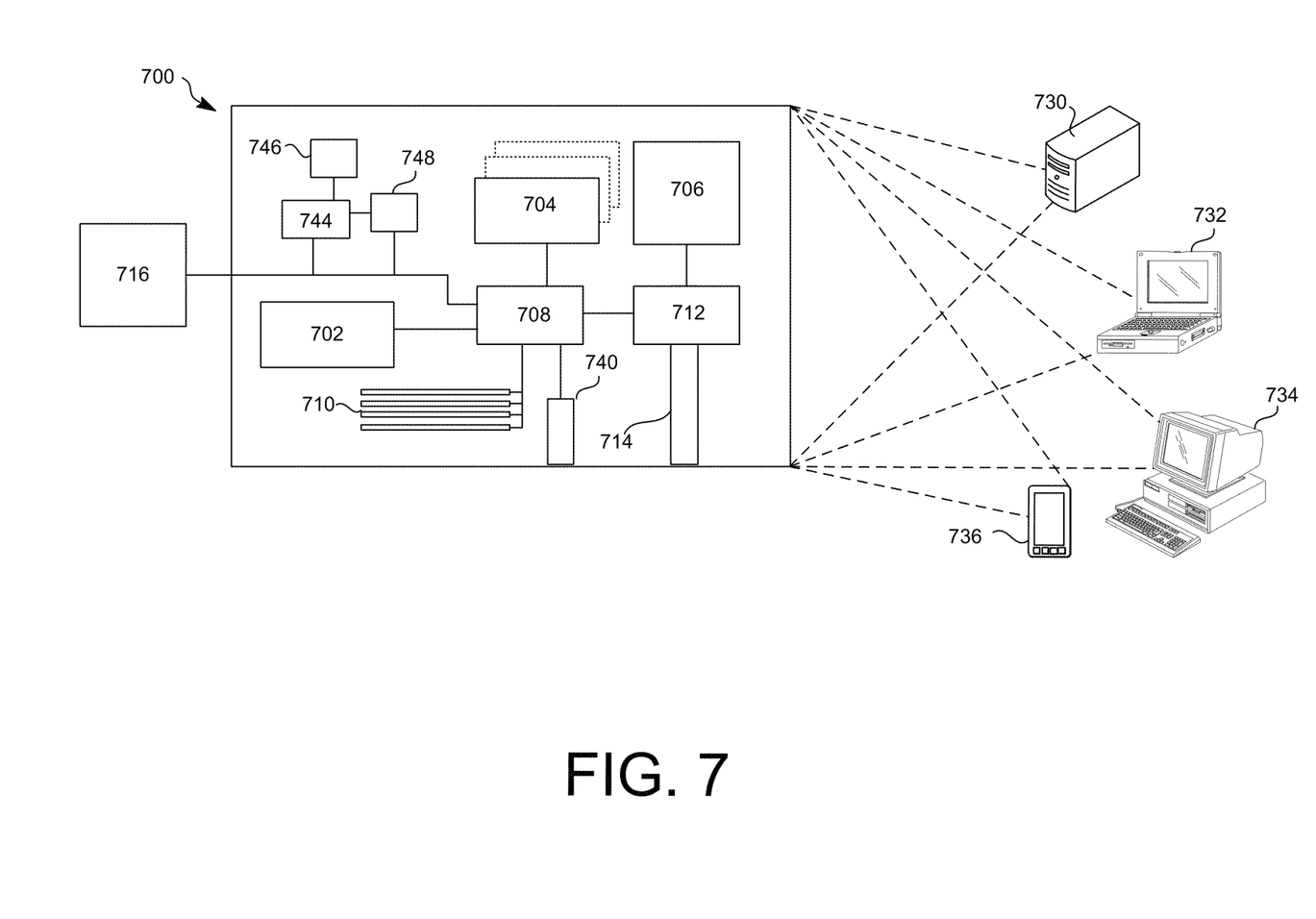
FIG. 7 shows an example of a computer device that can be used to implement the described techniques.

FIG. 7 shows an example of a generic computer device 700, which may be system 506, and/or document host 504 of FIG. 5, which may be used with the techniques described here. Computing device 700 is intended to represent various example forms of computing devices, such as laptops, desktops, workstations, personal digital assistants, cellular telephones, smart phones, tablets, servers, and other computing devices, including wearable devices. The components shown here, their connections and relationships, and their functions, are meant to be examples only, and are not meant to limit implementations of the inventions described and/or claimed in this document.

Computing device 700 includes a processor 702, memory 704, a storage device 706, and expansion ports 710 connected via an interface 708. In some implementations, computing device 700 may include transceiver 746, communication interface 744, and a GPS (Global Positioning System) receiver module 748, among other components, connected via interface 708. Device 700 may communicate wirelessly through communication interface 744, which may include digital signal processing circuitry where necessary. Each of the components 702, 704, 706, 708, 710, 740, 744, 746, and 748 may be mounted on a common motherboard or in other manners as appropriate.

The processor 702 can process instructions for execution within the computing device 700, including instructions stored in the memory 704 or on the storage device 706 to display graphical information for a GUI on an external input/output device, such as display 716. Display 716 may be a monitor or a flat touchscreen display. In some implementations, multiple processors and/or multiple buses may be used, as appropriate, along with multiple memories and types of memory. Also, multiple computing devices 700 may be connected, with each device providing portions of the necessary operations (e.g., as a server bank, a group of blade servers, or a multi-processor system).

The memory 704 stores information within the computing device 700. In one implementation, the memory 704 is a volatile memory unit or units. In another implementation, the memory 704 is a non-volatile memory unit or units. The memory 704 may also be another form of computer-readable medium, such as a magnetic or optical disk. In some implementations, the memory 704 may include expansion memory provided through an expansion interface.

The storage device 706 is capable of providing mass storage for the computing device 700. In one implementation, the storage device 706 may be or contain a computer-readable medium, such as a floppy disk device, a hard disk device, an optical disk device, or a tape device, a flash memory or other similar solid state memory device, or an array of devices, including devices in a storage area network or other configurations, but excludes transitory propagating signals. A computer program product can be tangibly embodied in such a computer-readable medium. The computer program product may also contain instructions that, when executed, perform one or more methods, such as those described above. The computer- or machine-readable medium is a storage device such as the memory 704, the storage device 706, or memory on processor 702.

The interface 708 may be a high speed controller that manages bandwidth-intensive operations for the computing device 700 or a low speed controller that manages lower bandwidth-intensive operations, or a combination of such controllers. An external interface 740 may be provided so as to enable near area communication of device 700 with other devices. In some implementations, controller 708 may be coupled to storage device 706 and expansion port 714. The expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 700 may be implemented in a number of different forms, as shown in the figure. For example, it may be implemented as a standard server 730, or multiple times in a group of such servers. It may also be implemented as part of a rack server system. In addition, it may be implemented in a personal computer such as a laptop computer 722, or smart phone 736. An entire system may be made up of multiple computing devices 700 communicating with each other. Other configurations are possible.

Figure 8:
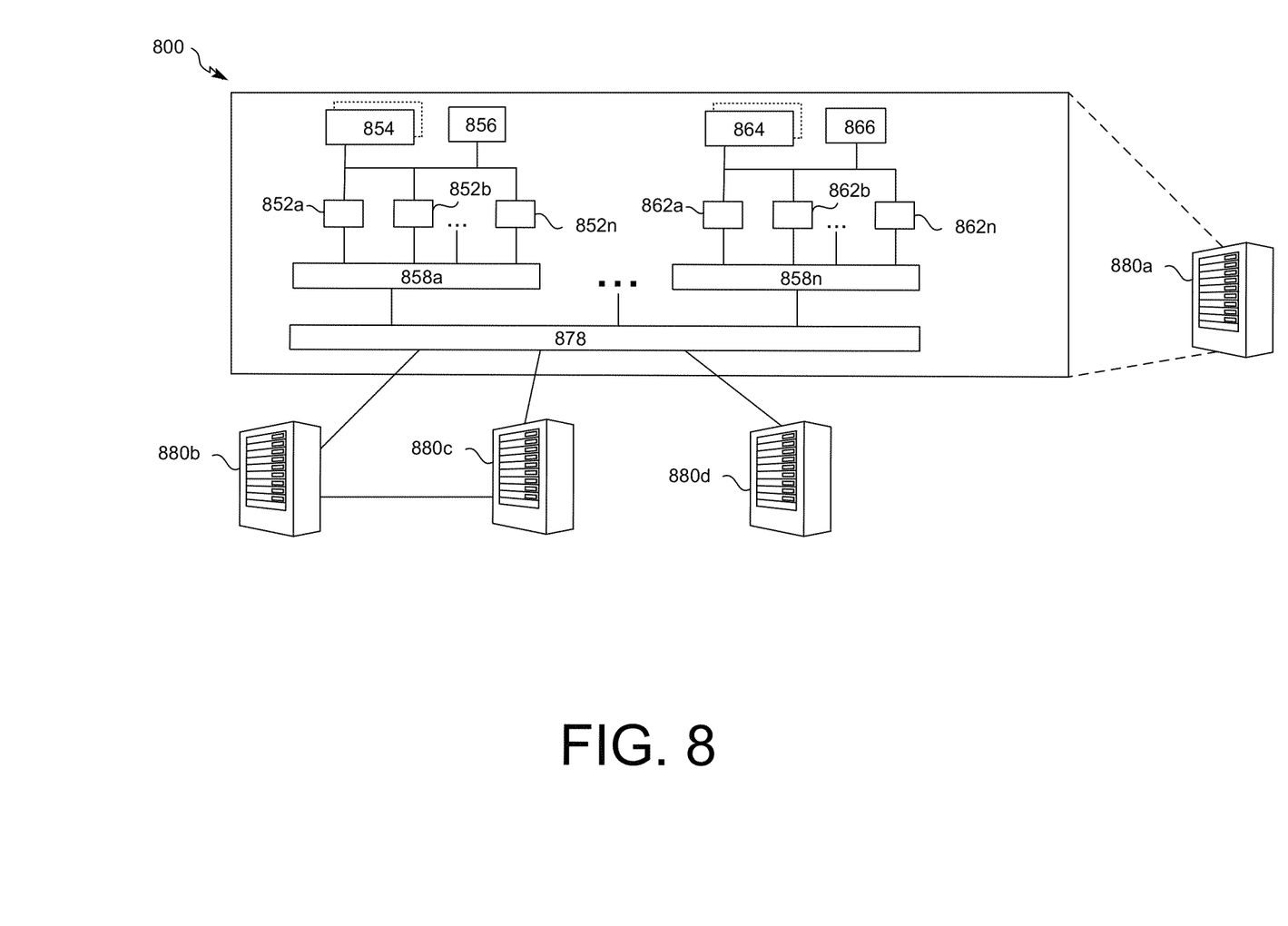
FIG. 8 shows an example of a distributed computer device that can be used to implement the described techniques.

FIG. 8 shows an example of a generic computer device 800, which may be system 506 or document host 504 of FIG. 1, which may be used with the techniques described here. Computing device 800 is intended to represent various example forms of large-scale data processing devices, such as servers, blade servers, datacenters, mainframes, and other large-scale computing devices. Computing device 800 may be a distributed system having multiple processors, possibly including network attached storage nodes, that are interconnected by one or more communication networks. The components shown here, their connections and relationships, and their functions, are meant to be examples only, and are not meant to limit implementations of the inventions described and/or claimed in this document.

Distributed computing system 800 may include any number of computing devices 880. Computing devices 880 may include a server or rack servers, mainframes, etc. communicating over a local or wide-area network, dedicated optical links, modems, bridges, routers, switches, wired or wireless networks, etc.

In some implementations, each computing device may include multiple racks. For example, computing device 880a includes multiple racks 858a-858n. Each rack may include one or more processors, such as processors 852a-852n and 862a-862n. The processors may include data processors, network attached storage devices, and other computer controlled devices. In some implementations, one processor may operate as a master processor and control the scheduling and data distribution tasks. Processors may be interconnected through one or more rack switches 858, and one or more racks may be connected through switch 878. Switch 878 may handle communications between multiple connected computing devices 800.

Each rack may include memory, such as memory 854 and memory 864, and storage, such as 856 and 866. Storage 856 and 866 may provide mass storage and may include volatile or non-volatile storage, such as network-attacked disks, floppy disks, hard disks, optical disks, tapes, flash memory or other similar solid state memory devices, or an array of devices, including devices in a storage area network or other configurations. Storage 856 or 866 may be shared between multiple processors, multiple racks, or multiple computing devices and may include a computer-readable medium storing instructions executable by one or more of the processors. Memory 854 and 864 may include, e.g., volatile memory unit or units, a non-volatile memory unit or units, and/or other forms of computer-readable media, such as a magnetic or optical disks, flash memory, cache, Random Access Memory (RAM), Read Only Memory (ROM), and combinations thereof but excluding transitory propagating signals. Memory, such as memory 854 may also be shared between processors 852a-852n. Data structures, such as an index, may be stored, for example, across storage 856 and memory 854. Computing device 800 may include other components not shown, such as controllers, buses, input/output devices, communications modules, etc.

An entire system, such as system 506, may be made up of multiple computing devices 800 communicating with each other. For example, device 880a may communicate with devices 880b, 880c, and 880d, and these may collectively be known as system 100. Furthermore, some of the computing devices may be located geographically close to each other, and others may be located geographically distant. The layout of system 800 is an example only and the system may take on other layouts or configurations.

Various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any non-transitory computer program product, apparatus and/or device (e.g., magnetic discs, optical disks, memory (including Read Access Memory), Programmable Logic Devices (PLDs)) used to provide machine instructions and/or data to a programmable processor.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

A number of implementations have been described. Nevertheless, various modifications may be made without departing from the spirit and scope of the invention. In addition, the logic flows depicted in the figures do not require the particular order shown, or sequential order, to achieve desirable results. In addition, other steps may be provided, or steps may be eliminated, from the described flows, and other components may be added to, or removed from, the described systems. The foregoing embodiments are therefore to be considered in all respects illustrative rather than limiting of the embodiments described herein. Scope is thus indicated by the appended claims, rather than by the foregoing description, and all changes that come within the meaning and range of equivalency of the claims are therefore intended to be embraced therein.

What is claimed is:
1. A computer implemented method comprising:
  receiving, by a processor of a computer system, at least a first first-level cluster of documents and a second first-level cluster of documents, wherein the first first-level cluster includes one or more first documents associated with a first domain, the first documents satisfying a first first-level classification criterion, the second first-level cluster including one or more second documents associated with a second domain, the second documents satisfying a second first-level classification criterion;

receiving a third first-level cluster of documents, wherein the third first-level cluster includes one or more third documents associated with a third domain and at least one of the third documents satisfying the first first-level classification criterion;

when the first domain does not match the second domain, creating, by a processor of the computer system, a second-level cluster by combining the first first-level cluster with the second first-level cluster when the first first-level cluster and second first-level cluster satisfy a second-level classification criterion; and when the first domain matches the second domain:
creating a first second-level cluster from at least the second first-level cluster of documents, and
creating a second second-level cluster by combining at least the first first-level cluster with the third first-level cluster when the first domain does not match the third domain.

2. The method of claim 1, wherein at least one of the third documents also satisfies the second first-level classification criterion and the first and second second-level clusters are a first potential grouping and the method further comprises creating a second potential grouping by:
creating a third second-level cluster from at least the first first-level cluster of documents; and
creating a fourth second-level cluster from at least the second first-level cluster of documents.

3. The method of claim 1, wherein the documents include web pages and the first-level classification criterion includes matching titles of web pages.

4. The method of claim 3, wherein the first-level classification criterion further includes matching titles of web pages or matching descriptions of web pages.

5. The method of claim 2, further comprising using a heuristic to choose between the first potential grouping and the second potential grouping.

6. The method of claim 1, further comprising:
creating a plurality of second-level clusters, and
creating a third-level cluster from at least some of the second-level clusters, wherein each second-level cluster in the third-level cluster shares at least one common third-level classification criterion value and has different domains than the other second-level clusters in the third-level cluster.

7. The method of claim 1, further comprising creating an index of the documents of the second-level cluster.

8. A computer storage device storing instructions that, when executed by the at least one processor, cause the computer system to perform the method of claim 1.

9. A computer implemented method comprising:
a) receiving a first document having a first clustering value and a second clustering value from a first domain;
b) assigning, by at least one processor of a computing system, the first document to a first first-level cluster;
c) receiving a second document having a third clustering value and a fourth clustering value from the first domain, the third and fourth clustering values differing from the first and second clustering values;
d) assigning, by at least one processor of the computing system, the second document to a second first-level cluster based on the third and fourth clustering values differing from the first and second clustering values;
e) receiving a third document having the first clustering value and the fourth clustering value from a second domain, the second domain differing from the first domain;
f) assigning, by at least one processor of the computing system, the third document to a third first-level cluster based on the second domain differing from the first domain;
g) generating, by at least one processor of the computing system, a first second-level cluster by combining the third first-level cluster with one of either the first first-level cluster or the second first-level cluster based on the second domain differing from the first domain; and
h) generating a second second-level cluster that includes either the first first-level cluster that was not combined with the third first-level cluster or the second first-level cluster that was not combined with the third first-level cluster.

10. The method of claim 9, wherein generating the first second-level cluster includes selecting either the first first-level cluster or the second first-level cluster at random for inclusion in the first second-level cluster.

11. The method of claim 9, wherein all members of a particular first-level cluster are from the same domain.

12. The method of claim 9, wherein all members of a particular second-level cluster are from first-level clusters with differing domains.

13. The method of claim 12, wherein the third first-level cluster is combined with the first first-level cluster based on matching first clustering values.

14. A system for clustering a plurality of first-level clusters of documents, wherein each first-level cluster of documents have a common domain within the first-level cluster, the plurality of first-level clusters representing a plurality of domains, the system comprising:
at least one processor; and
a memory including code representing instructions that when executed cause the at least one processor to:
a) select a first first-level cluster of a first domain;
b) mark the first first-level cluster as a first second-level cluster;
c) select one first-level cluster from each domain of the plurality of domains that differs from the first domain;
d) assign each of the first-level clusters from each domain that differs from the first domain to the first second-level cluster; and
e) emit the second-level cluster.

15. The system of claim 14, wherein the memory includes code representing instructions that when executed cause the at least one processor to repeat steps a), b), c), d) and e) for a second first-level cluster that is not assigned to the first second-level cluster.

16. The system of claim 15, wherein the memory includes code representing instructions that when executed cause the at least one processor to repeat steps a), b), c), d) and e) until all first-level clusters have been assigned to a second-level cluster.

17. The system of claim 14, wherein the memory includes code representing instructions that when executed cause the at least one processor to randomly select one first-level cluster from each domain other than the first domain.

* * * * *